(12) United States Patent
Nishizawa

(10) Patent No.: US 7,367,582 B2
(45) Date of Patent: May 6, 2008

(54) AIRBAG APPARATUS

(75) Inventor: Muneo Nishizawa, Omihachiman (JP)

(73) Assignee: Takata Corporation, Tokyo (JP)

( * ) Notice: Subject to any disclaimer, the term of this patent is extended or adjusted under 35 U.S.C. 154(b) by 447 days.

(21) Appl. No.: 11/017,006

(22) Filed: Dec. 21, 2004

(65) Prior Publication Data

US 2005/0140122 A1 Jun. 30, 2005

(30) Foreign Application Priority Data

Dec. 25, 2003 (JP) .............................. 2003-430650

(51) Int. Cl.
*B60R 21/16* (2006.01)
(52) U.S. Cl. .................................. 280/730.2
(58) Field of Classification Search ................ 280/729, 280/730.1, 742, 743.1, 730.2
See application file for complete search history.

(56) References Cited

U.S. PATENT DOCUMENTS

| | | | | |
|---|---|---|---|---|
| 6,042,141 | A * | 3/2000 | Welch et al. ................ | 280/729 |
| 6,293,581 | B1 * | 9/2001 | Saita et al. ................ | 280/730.2 |
| 6,394,487 | B1 * | 5/2002 | Heudorfer et al. ........... | 280/729 |
| 6,471,240 | B2 * | 10/2002 | Bakhsh et al. .............. | 280/729 |
| 6,481,743 | B1 * | 11/2002 | Tobe et al. ............... | 280/728.2 |
| 6,485,048 | B2 * | 11/2002 | Tajima et al. ............ | 280/728.2 |
| 6,846,010 | B2 * | 1/2005 | Enders ..................... | 280/730.2 |
| 6,877,771 | B2 * | 4/2005 | Weber ........................ | 280/742 |
| 6,883,827 | B2 | 4/2005 | Keshavaraj | |
| 6,971,665 | B2 * | 12/2005 | Tanaka ....................... | 280/729 |
| 7,080,853 | B2 * | 7/2006 | Ogata ....................... | 280/730.2 |
| 2003/0234523 | A1 * | 12/2003 | Henderson et al. ........ | 280/730.2 |
| 2004/0017067 | A1 | 1/2004 | Daines et al. | |
| 2006/0097491 | A1 * | 5/2006 | Saberan et al. ........... | 280/730.1 |

FOREIGN PATENT DOCUMENTS

| | | |
|---|---|---|
| JP | 11-208410 | 8/1999 |
| JP | 2001-328504 | 11/2001 |
| JP | 2002-67863 | 3/2002 |

* cited by examiner

*Primary Examiner*—Paul N. Dickson
*Assistant Examiner*—Joseph Rocca
(74) *Attorney, Agent, or Firm*—Manabu Kanesaka

(57) ABSTRACT

An airbag apparatus is installed in a vehicle having a three-seat-row arrangement, and includes a vehicle airbag having a plurality of sections and a gas supplying device. The vehicle airbag is installed on an upper sidewall of the vehicle, and inflated downwardly in passenger-protection regions located between passengers on the seats and a sidewall of the vehicle for protecting the passengers during an accident such as a side collision or roll-over. The gas supplying device is capable of generating an inflation gas for inflating the airbag. The sidewall constitutes a large area on a side of the vehicle at a left or right side of the passenger such as a side window or a door. The vehicle airbag is typically installed in an area between a side roof panel on an upper region of the sidewall and a ceiling panel.

3 Claims, 7 Drawing Sheets

AIRBAG APPARATUS

BACKGROUND OF THE INVENTION AND RELATED ART STATEMENT

The present invention relates to an airbag apparatus installed in a vehicle such as an automobile. More specifically, the present invention relates to an airbag apparatus for preventing a passenger from colliding against a sidewall of a vehicle in an accident such as a side collision or roll-over.

There have been proposed various airbag apparatus for protecting a passenger from colliding into a sidewall of a vehicle such as a side window and door upon a vehicle accident such as a side collision or roll-over. For example, an airbag apparatus including a vehicle airbag stored along a side roof rail of an automobile has been proposed (for example, refer to Japanese Patent Publication (Kokai) No. 2001-328504).

Japanese Patent Publication (Kokai) No. 2001-328504 has disclosed a technology for reliably inflating an airbag in a vehicle having two rows of seats. However, for a large vehicle having at least three rows of seats, it is necessary to improve the technology so that a sufficiently large airbag can be inflated quickly and reliably in a passenger-protection region between a sidewall of the vehicle and a passenger.

In view of the problems mentioned above, an object of the present invention is to provide an airbag apparatus for safely protecting a passenger upon a vehicle accident.

Further objects and advantages of the invention will be apparent from the following description of the invention.

SUMMARY OF THE INVENTION

In order to attain the objects described above, according to the present invention, an airbag apparatus can be installed in various vehicles having a three-seat-row arrangement such as an automobile, train, and marine vessel. In such a vehicle, the three-seat-row arrangement may be a standard configuration or arranged as an option.

According to a first aspect of the present invention, an airbag apparatus is installed in a vehicle having a three-seat-row arrangement, and comprises a vehicle airbag having a plurality of sections and a gas supplying device. The vehicle airbag is installed in an upper sidewall of the vehicle, and inflated downwardly in a passenger-protection region between a passenger in a seat and a sidewall of the vehicle for protecting the passenger upon an accident such as a side collision or roll-over. The gas supplying device such as an inflator is capable of generating an inflation gas for inflating the airbag. The sidewall includes a member constituting a large area on a side of the vehicle at a left or right side of the passenger such as a side window or a door. The vehicle airbag is typically installed in an area between a side roof panel at an upper region of the sidewall and a ceiling panel.

In the first aspect of the present invention, the vehicle airbag includes a plurality of independent sections separating an inside of the airbag. The gas supplying device individually supplies gas to each section for inflating the airbag. That is, the gas supplying device is activated upon a vehicle collision for individually supplying gas to each section. The vehicle airbag may include one airbag having a plurality of sections or a plurality of airbags each having a plurality of sections. The gas supplying device may comprise a plurality of gas supplying devices corresponding to the sections of the airbag and disposed apart from each other. A plurality of gas supplying devices may be provided as a unit. A housing may be provided for retaining a plurality of independent gas-generating mechanisms.

In the first aspect of the present invention, the vehicle airbag may have a section to be inflated in a passenger-protection region corresponding to at least a third seat-row. Accordingly, a predetermined section of the vehicle airbag is inflated across a plurality of passenger-protection regions including the passenger-protection region corresponding to the third seat-row.

In the first aspect of the airbag apparatus, the airbag can be inflated quickly and reliably even when the airbag has a large size and a large inflation volume suitable for a large vehicle having the three-seat-row arrangement. More specifically, in a large vehicle capable of having at least the three-seat row arrangement, an airbag needs to have a large size and volume as opposed to an airbag for a small vehicle having just a two-seat row arrangement. Accordingly, an airbag for a large vehicle needs to be quickly and reliably inflated. In the first aspect of the present invention, the airbag of the airbag apparatus is divided into a plurality of independent sections. Furthermore, the gas supplying device individually supplies gas to each section. Accordingly, it is possible to quickly supply gas to each section even when the airbag has a large size and large volume. Moreover, it is possible to reliably supply gas to a plurality of sections in comparison with a case in which a single gas generating device supplies gas to each section.

An inside of the airbag may be divided into various shapes. For example, in a vehicle capable of having the three-seat-row arrangement, the inside of the airbag may be divided into three sections corresponding to each of the three seat-rows (total of three sections). Alternatively, the airbag may be divided into one section corresponding to one seat-row and one section corresponding to two other seat-rows (total of two sections) Further, the airbag may be divided into one section corresponding to the first and second seat-rows, and one section corresponding to the second and third seat-rows (total of two sections).

According to a second aspect of the present invention, in the airbag apparatus of the first aspect, the airbag has a section to be inflated in a passenger-protection region corresponding to a plurality of seat-rows.

In the airbag apparatus of the second aspect, the section of the airbag is inflated across a plurality of passenger-protection regions, thereby making a structure simple. The airbag has a section corresponding to the third seat-row as well as a plurality of passenger-protection regions. The airbag may have a section corresponding to seat-rows other than the third seat-row as well as a plurality of passenger-protection regions. In other words, the section to be inflated in the passenger-protection region corresponding to the third seat-row is inflated across a plurality of seat-rows including the third seat-row. Alternatively, the section to be inflated in the passenger-protection region corresponding to the seat-rows other than the third seat-row may be inflated across a plurality of seat-rows including the seat-rows other than the third seat-row.

According to a third aspect of the present invention, in the airbag apparatus of the first or second aspect, the airbag may have a plurality (at least two) of sections to be inflated so that the inflated sections overlap in the passenger-protection region corresponding to a predetermined seat-row. For example, when the airbag is inflated, two sections overlap vertically or horizontally in a passenger-protection region corresponding to the second seat-row. In this case, the sections may entirely or partially overlap each other. In the airbag apparatus of the third aspect, it is possible to protect a passenger seated in the predetermined seatrow with the inflated sections.

According to a fourth aspect of the present invention, in the airbag apparatus of one of the first to third aspects, the airbag may extend continuously from a region corresponding to the first seat-row to at least the region corresponding to the third seat-row over the upper portion of the sidewall. Typically, in a vehicle capable of having a three-seat-row arrangement, the vehicle airbag is arranged to extend continuously from an A pillar to a B pillar (front intermediate pillar), i.e. the region corresponding to the first seat-row, and to a D pillar through a C pillar (rear intermediate pillar), i.e. the region corresponding to the third seat-row.

In the airbag apparatus of the fourth aspect, the airbag is arranged to extend continuously from a region corresponding to the first seat-row to a region corresponding to at least the third seat-row, and is inflated at once in the passenger-protection regions corresponding to each seat-row. Accordingly, as compared with a case wherein an airbag does not extend continuously from the region corresponding to the first seat-row to the region corresponding to at least the third seat-row, it is possible to inflate and deploy the airbag in the passenger-protection region without a-delay in timing.

According to a fifth aspect of the present invention, an airbag apparatus is installed in a vehicle capable of having a three-seat-row arrangement and includes at least a vehicle airbag having a plurality of sections and gas supplying device. The airbag apparatus includes a first section and a second section separating an inside of the vehicle airbag into independent sections; first gas supplying device capable of individually supplying inflation gas to the first section; and second gas supplying devise capable of individually supplying inflation gas to the second section. In particular, the vehicle airbag continuously extends over an upper portion of the sidewall from a region corresponding to the first seat-row to a region corresponding to the third seat-row. When the vehicle airbag is inflated, the first and second sections overlap each other in a passenger-protection region corresponding to the second seat-row.

In the airbag apparatus of the fifth aspect, the airbag can be quickly and reliably inflated even when the airbag has a large size and volume suitable for a large vehicle capable of having a three-seat-row arrangement. A passenger in the second seat-row can be reliably protected with the inflated first and second sections. The vehicle airbag extends continuously from the region corresponding to the first seat-row to the region corresponding to the third seat-row. Accordingly, as compared with a case wherein a vehicle airbag does not extend from the region corresponding to the first seat-row to the region corresponding to the third seat-row, it is possible to inflate and deploy the airbag in the passenger-protection region without a delay in timing.

As described above, according to the present invention, the airbag apparatus comprises a plurality of the independent sections separating the inside of the vehicle airbag and the gas supplying device for individually supplying inflation gas to the sections. A predetermined section is inflated in a passenger-protection region corresponding to at least the third seat-row. Accordingly, with the airbag apparatus, it is possible to safely protect a passenger in a large vehicle capable of having at least a three-seat-row arrangement during an accident.

DETAILED DESCRIPTION OF PREFERRED EMBODIMENTS

Hereunder, embodiments of the present invention will be described with reference to the accompanying drawings. A structure and operation of an airbag apparatus 100 according to an embodiment of the present invention will be described with reference to FIGS. 1 to 5. The airbag apparatus 100 shown in FIG. 1 to 5 is installed on a right side of a vehicle to protect a passenger seated on the right side of the vehicle.

Figure 1:
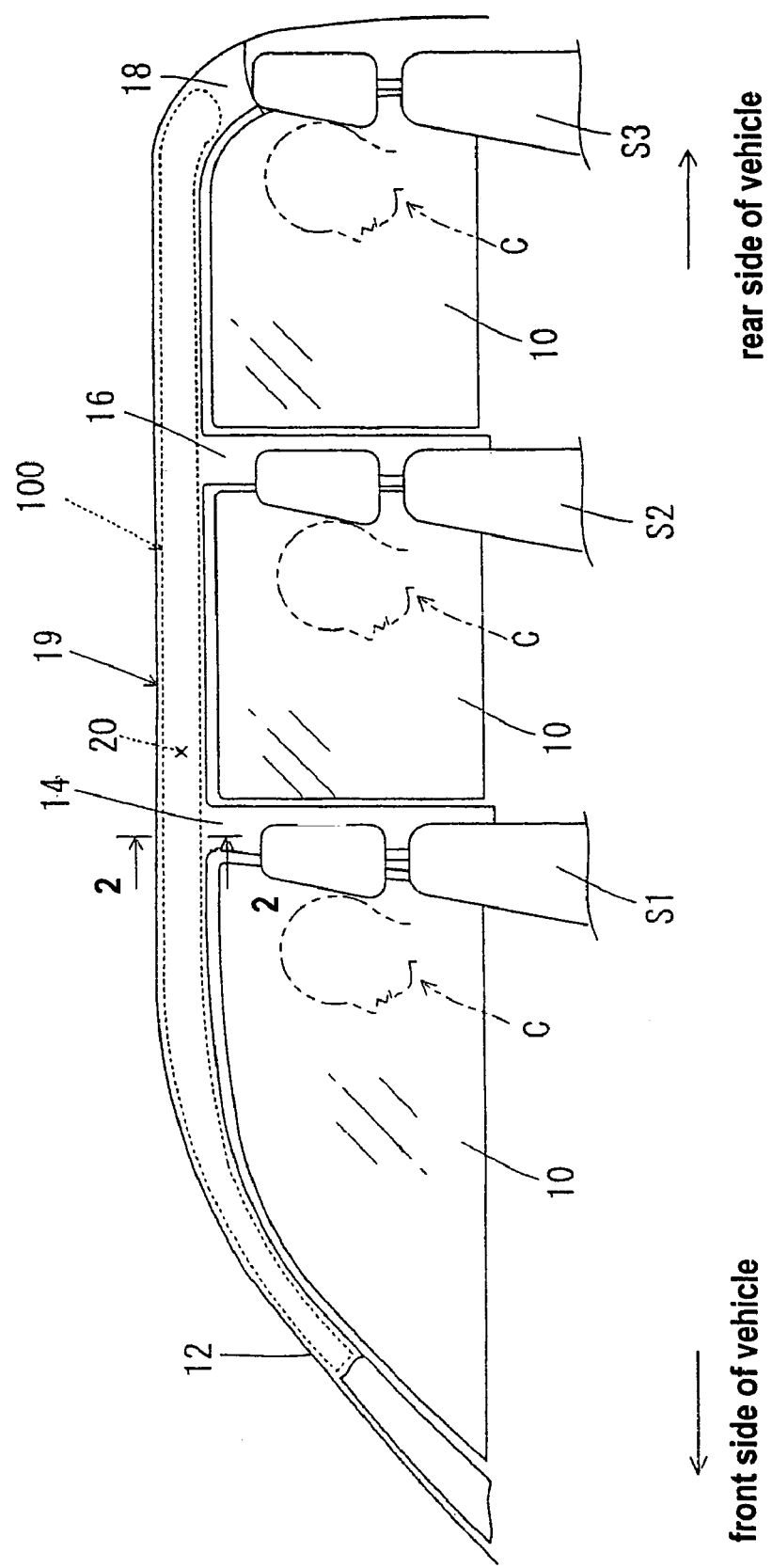
FIG. 1 is a schematic view-of an airbag apparatus disposed in a vehicle according to an embodiment of the present invention.
Figure 2:
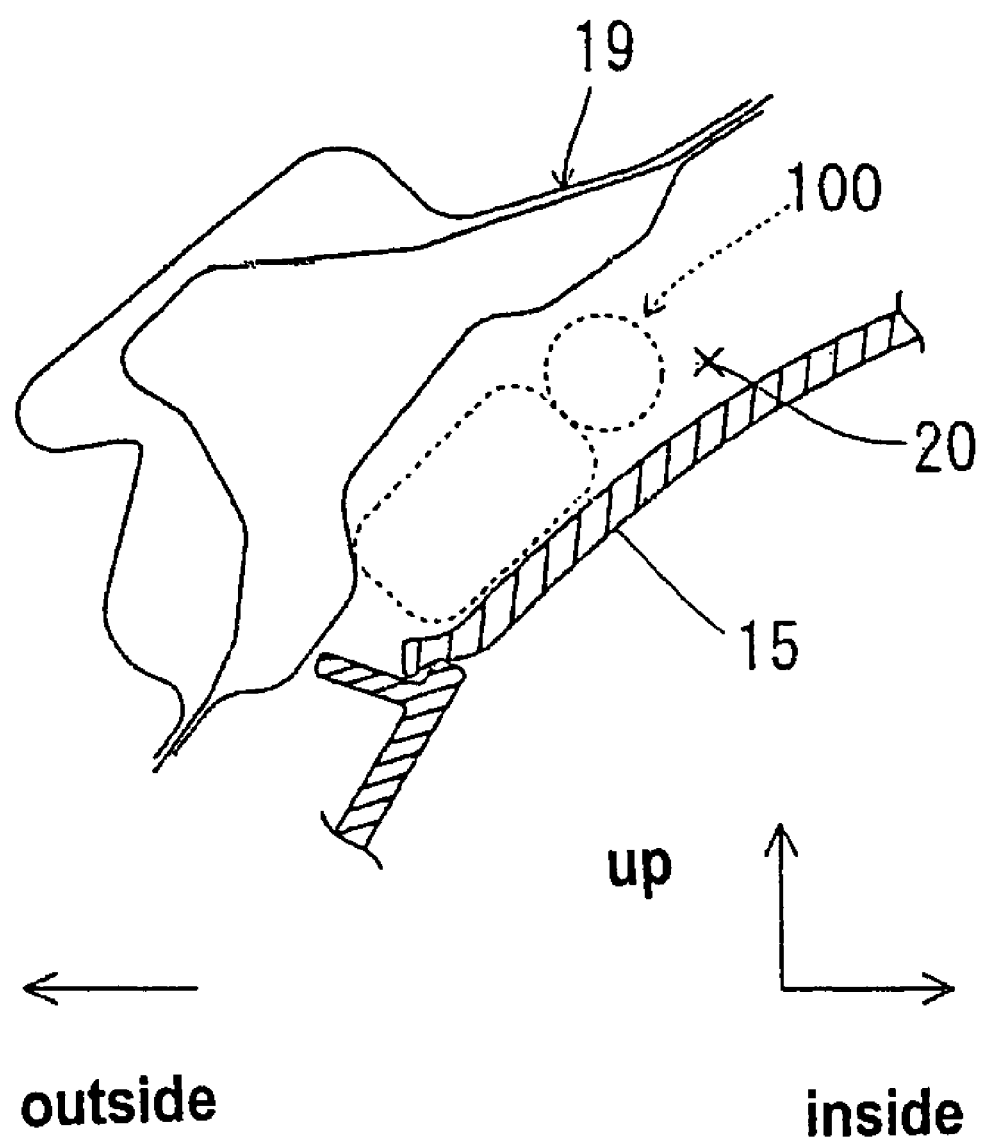
FIG. 2 is a partial cross-sectional view of a B-pillar taken along line 2-2 in FIG. 1.
Figure 3:
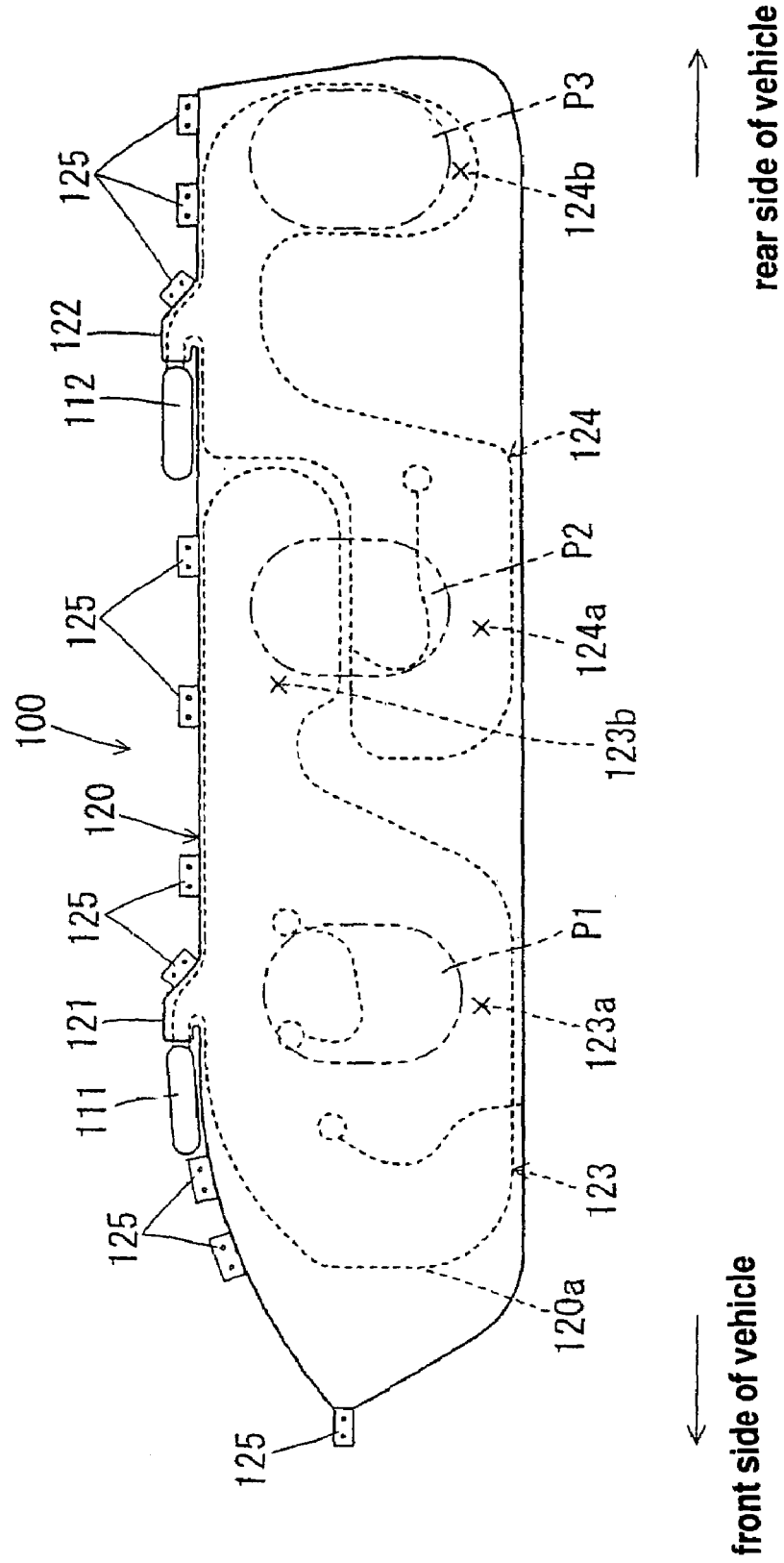
FIG. 3 is a view showing a structure of the airbag apparatus shown in FIG. 2 and an airbag in an inflated state.

FIG. 1 is a schematic view of the airbag apparatus 100 installed in the vehicle according to the embodiment. FIG. 2 is a partial cross-sectional view of a B-pillar 14 taken along line 2-2 in FIG. 1. The airbag apparatus 100 shown in FIG. 2 is in an initial state before being operated. FIG. 3 is a view showing a structure of the airbag apparatus 100 shown in FIG. 2 and an airbag 120 in an inflated state. In FIGS. 1 and 3, a left direction is a direction toward a front side of the vehicle and a right direction is a direction toward a rear side of the vehicle. FIG. 2 is a view showing a right sidewall of the vehicle, wherein a right direction is a direction toward an inside of the vehicle and a left direction is a direction toward an outside of the vehicle.

As shown in FIG. 1, the vehicle (automobile) in which the airbag apparatus 100 is installed is capable of having a three-seat-row arrangement. More specifically, the automobile includes a first seat-row (a first seat) S1, a second seat-row (a second seat) S2, and a third seat-row (a third seat) S3. In each of the seat-rows, one or more passengers C can be seated. The automobile may have three fixed seat-rows, or the seats may be arranged in the three seat-row arrangement as an option.

As shown in FIGS. 1 and 2, the airbag apparatus 100 is disposed above a side window 10 in a space 20 defined by a ceiling panel 15 and a right-side roof rail (vehicle panel) 19. The airbag apparatus 100 is disposed along a direction that the right-side roof rail 19 extends through an A pillar 12, a B pillar (a front intermediate pillar) 14, a C pillar (a rear intermediate pillar) 16, and a D pillar 18. More specifically, the airbag apparatus 100 includes the airbag 120 (described below) and inflators 111 and 112, and extends continuously over an upper region of a sidewall from a region corresponding to the first seat-row S1 between the A pillar 12 and the B pillar 14 to a region corresponding to the third seat-row S3 between the C pillar 16 and the D pillar 18.

The airbag apparatus 100 quickly and reliably protects the passengers upon a vehicle accident such as a side collision or roll-over. The airbag apparatus 100 includes a vehicle airbag stored in a predetermined folded form (bellows or a roll) and inflators (gas generating units) capable of generating and supplying gas into an inner space of the airbag. In the embodiment, as shown in FIG. 3, the airbag apparatus 100 mainly includes the single airbag 120 formed in a bag shape, the first inflator 111 and the second inflator 112 for supplying gas to the airbag 120, and a plurality of brackets 125 for fixing the airbag 120 to the roof rail 19 on the right side.

As shown in FIG. 3, the airbag 120 corresponds to a vehicle airbag in the present invention. An inner space of the airbag 120 is individually divided into a front inflatable part 123 and a rear inflatable part 124 with stitches 120a indicated as hidden lines in FIG. 3. The front inflatable part 123 and the rear inflatable part 124 are independent regions formed by sectioning the inside of the airbag 120. In the present invention, the front inflatable part 123 corresponds to a section or a first section, and the rear inflatable part 124 corresponds to a section or a second section.

In the airbag 120, the first inflator 111 is connected to the front inflatable part 123, and the second inflator 112 is connected to the rear inflatable part 124. More specifically, the first inflator 111 independently supplies inflation gas to the front inflatable part 123. The inflation gas is independently supplied to the front inflatable part 123 via a first inlet 121 facing the rear side of the vehicle. The second inflator 112 independently supplies inflation gas to the rear inflatable part 124. The inflation gas is independently supplied to the rear inflatable part 124 via a second inlet 122 facing the rear ride of the vehicle. In the embodiment, the inflators 111 and 112 are disposed so as to be apart from each other. The first inflator 111 corresponds to a gas supplying device or a first gas supplying device, and the second inflator 112 corresponds to a gas supplying device or a second gas supplying device.

The front inflatable part 123 of the airbag 120 includes a first inflatable chamber 123a and a second inflatable chamber 123b. The first inflatable chamber 123a is to be inflated in an area corresponding to a passenger-protection region P1 of the passenger C seated in the first seat-row (the first seat-row S1 shown in FIG. 1). The second inflatable chamber 123b is to be inflated in an area corresponding to a passenger-protection region P2 of the passenger C seated in the second seat-row (the second seat-row S2 shown in FIG. 1). The rear inflatable part 124 of the airbag 120 includes a third inflatable chamber 124a and a fourth inflatable chamber 124b. The third inflatable chamber 124a is to be inflated in an area corresponding to a passenger-protection region P2 of the passenger C seated in the second seat-row (the second seat-row S2 shown in FIG. 1). The fourth inflatable chamber 124b is to be inflated in an area corresponding to a passenger-protection region P3 of the passenger C seated in the third seat-row (the third seat-row S3 shown in FIG. 1). The passenger-protection regions P1, P2, and P3 are formed between the passengers C and the sidewall of the vehicle. The passenger-protection regions P1, P2, and P3 are protection regions for protecting at least heads of the passengers C. In the present invention, the passenger-protection regions P1, P2, and P3 correspond to the passenger-protection regions.

In the embodiment, the third inflatable chamber 124a is disposed below the second inflatable chamber 123b, so that the inflatable chambers 124a and 123b overlap each other. The second inflatable chamber 123b is inflated in the upper portion of the passenger-protection region P2 for the passenger C in the second seat-row S2, and the third inflatable chamber 124a is inflated in the lower portion of the passenger-protection region P2. In other words, the airbag 120 includes the front inflatable part 123 and the rear inflatable part 124 partially overlapping each other in the vertical direction when inflated.

Figure 4:
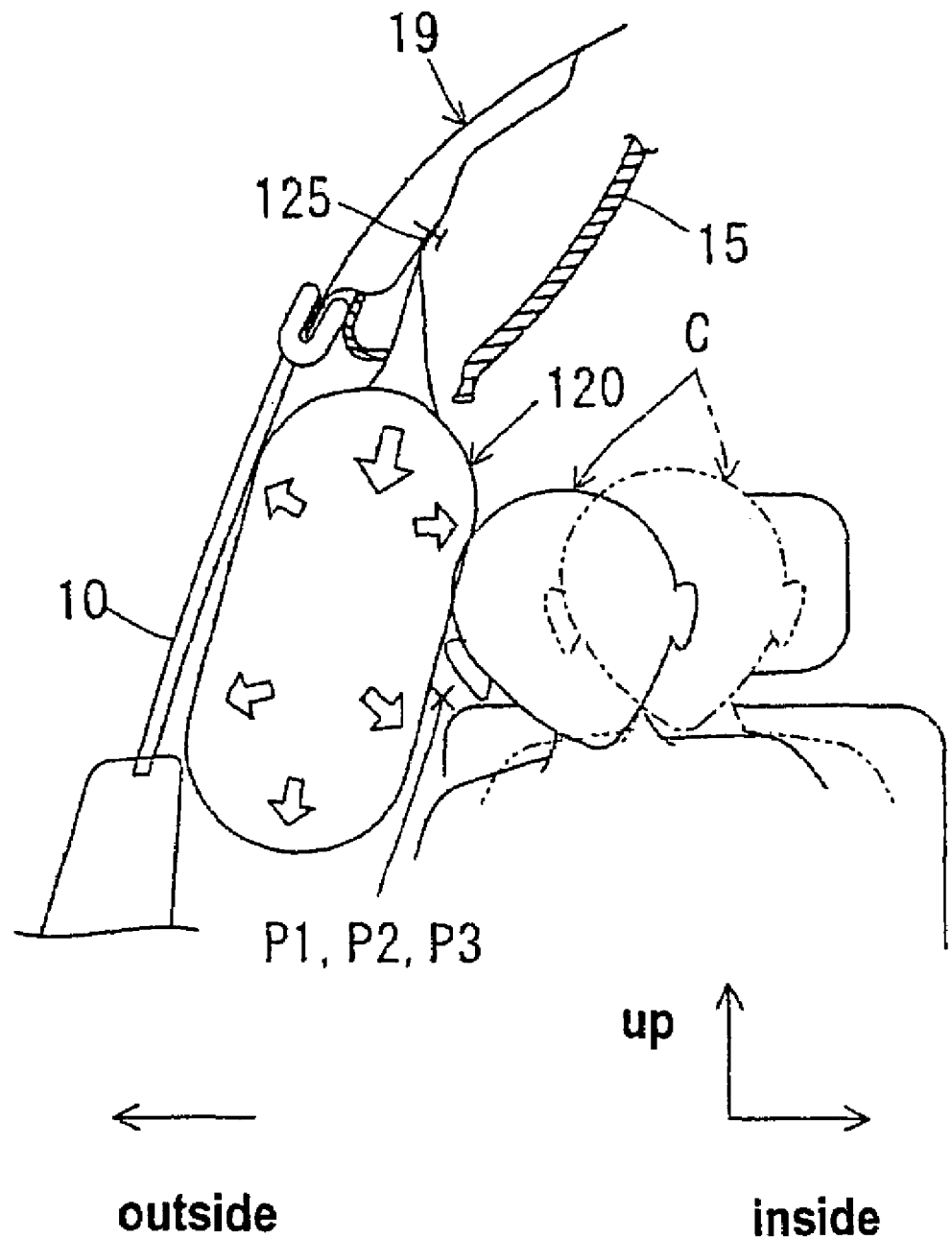
FIG. 4 is a view showing the airbag shown in FIG. 3 seen from a front side of a vehicle when the airbag is completely inflated.
Figure 5:
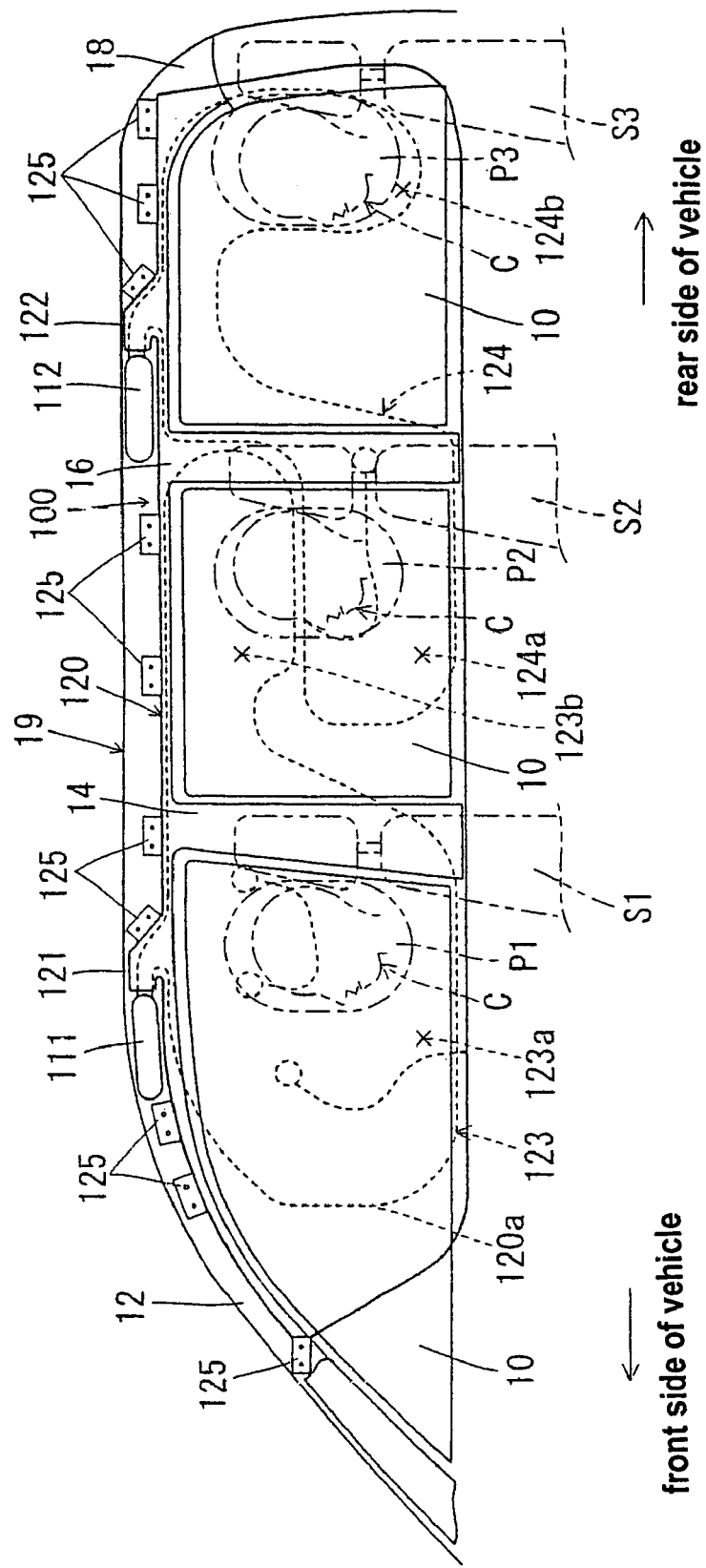
FIG. 5 is a view showing the airbag shown in FIG. 3 seen from a side of the vehicle when the airbag is completely inflated.

An operation of the airbag apparatus 100 having the structure described above will be described next with reference to FIGS. 4 and 5. FIG. 4 is a view showing the airbag 120 shown in FIG. 3 seen from the front side of the vehicle when the airbag 120 is completely inflated. FIG. 5 is a view showing the airbag 120 shown in FIG. 3 seen from a side of the vehicle when the airbag 120 is completely inflated. In FIG. 4, the head of the passenger C is located at a position indicated by phantom line before a side collision or roll-over of the vehicle, and is located at a position indicated by a solid line when a side collision or roll-over of the vehicle occurs. FIG. 4 is a view showing the right sidewall of the vehicle, and a right direction is a direction toward the inside of the vehicle and a left direction is a direction toward the outside of the vehicle. In FIG. 5, a left direction is the direction toward the front side of the vehicle and the right direction is the direction toward the rear side of the vehicle.

When the vehicle undergoes a side collision or roll-over, the airbag apparatus 100 in the initial state is activated, and the first inflator 111 and the second inflator 112 generate the inflation gas. The gas generated from the first inflator 111 is supplied to the inner space of the front inflatable part 123 through the first inlet 121. The gas generated from the second inflator 112 is supplied to the inner space of the rear inflatable part 124 through the second inlet 122. The gas is steadily directed into the inner spaces of the front inflatable part 123 and the rear inflatable part 124 through the first inlet 121 and the second inlet 122, respectively, to produce a predetermined flow of gas. Accordingly, the entire airbag 120 starts to be inflated (expands while deploying). As shown in FIG. 4, the airbag 120 pushes the ceiling panel 15 to open and is inflated downwardly into the passenger-protection regions P1, P2, and P3 between the right sidewall (side window 10) and the passengers C.

Accordingly, the airbag 120 is inflated as shown in FIGS. 4 and 5. The upper portion of the airbag 120 is supported on the right-side roof rail 19 with the plurality of brackets 125, and is quickly and reliably inflated in the space between the right sidewall (side window 10) and the heads of the passengers C (passenger-protection regions P1, P2, and P3 in FIG. 4). At this time, among the inflatable parts of the airbag 120, the first inflatable chamber 123a of the front inflatable part 123 is inflated in the passenger-protection region P1 corresponding to the first seat-row S1 for protecting at least the head of the passenger C seated in the first seat-row S1. Among the inflatable parts of the airbag 120, the second inflatable chamber 123b of the front inflatable part 123 and the third inflatable chamber 124a of the rear inflatable part 124 is inflated while vertically overlapping each other in the passenger-protection region P2 corresponding to the second seat-row S2 (passenger-protection regions corresponding to a predetermined number of seat-rows) for protecting at least the head of the passenger C seated in the second seat-row S2. Among the inflatable parts of the airbag 120, the fourth inflatable chamber 124b of the rear inflatable part 124 is inflated in the passenger-protection region P3 corresponding to the third seat-row S3 for protecting at least the head of the passenger C seated in the third seat-row S3. Accordingly, the airbag 120 has the inflatable part (section) inflated in at least the passenger-protection region P3 corresponding to the third seat-row S3.

As described above, the airbag apparatus 100 according to the present invention can be quickly and reliably inflated even when the airbag has a large size and volume suitable for a large vehicle capable of having at least a three-seat-row arrangement. More specifically, an airbag for a large vehicle capable of having a three-seat-row arrangement needs to have a large size and volume as opposed to an airbag for a small vehicle having a two-seat-row arrangement. Accordingly, the airbag for a large vehicle needs to have a special structure to be quickly and reliably inflated.

In the embodiment, the inside of the airbag 120 of the airbag apparatus 100 is sectioned into the front inflatable part 123 and the rear inflatable part 124. Furthermore, the inflators 111 and 112 are used to individually supply gas to each inflatable part. Accordingly, it is possible to quickly supply gas to each inflatable part even when the airbag 120 has a large size and volume. Moreover, it is possible to reliably supply gas to a plurality of inflatable parts as compared with distributing and supplying gas from one inflator to each inflatable part.

In the embodiment, the airbag 120 of the airbag apparatus 100 has a simple structure in which one inflatable part (front inflatable part 123) is inflated across the two passenger-protection regions P1 and P2 and another inflatable part (rear inflatable part 124) is inflated across the two passenger-protection regions P2 and P3. The inflated front inflatable part 123 and rear inflatable part 124 overlap each other in the passenger-protection region P2 corresponding to the second seat-row S2, thereby reliably protecting the passenger C seated in the second seat-row S2.

In the embodiment, the airbag 120 of the airbag apparatus 100 extends continuously in the upper portion of the sidewall of the vehicle from the A pillar 12 to the B pillar 14, i.e. a region corresponding to the first seat-row S1, and to the D pillar 18 through the C pillar 16, i.e. a region corresponding to the third seat-row S3. Accordingly, as compared with a case wherein an airbag does not extend continuously from the A pillar 12 to the B pillar 14, and extend to the D pillar 18 through the C pillar 16, it is possible to inflate the airbag 120 in the passenger-protection region without a delay in inflation timing.

The present invention is not limited to the embodiment described above, and may include various modifications and variations. For example, the embodiment described above may be modified to other embodiments as follows.

In the embodiment described above, the airbag apparatus 100 is provided on the right side of the vehicle for protecting the passengers C seated on the right side of the vehicle. Another airbag apparatus with a structure same as that of the airbag apparatus 100 may be provided on the left side of the vehicle for protecting passengers C seated on the left side of the vehicle. In this case, the airbag apparatus on the left side has a structure symmetrical to that of the airbag apparatus 100 and is fixed to a left side roof rail.

Figure 6:
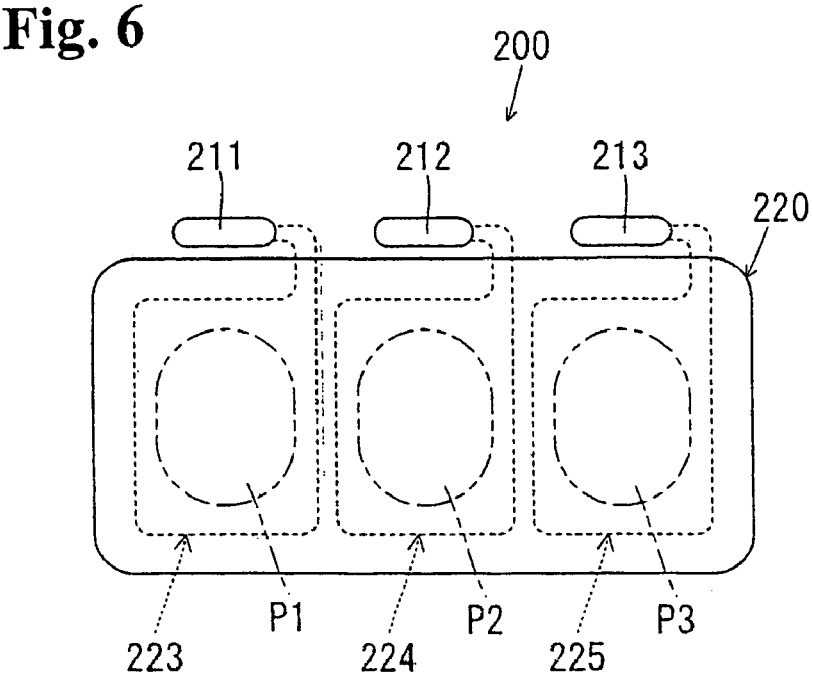
FIG. 6 is a schematic view showing a structure of an airbag apparatus according to another embodiment of the present invention.
Figure 7:
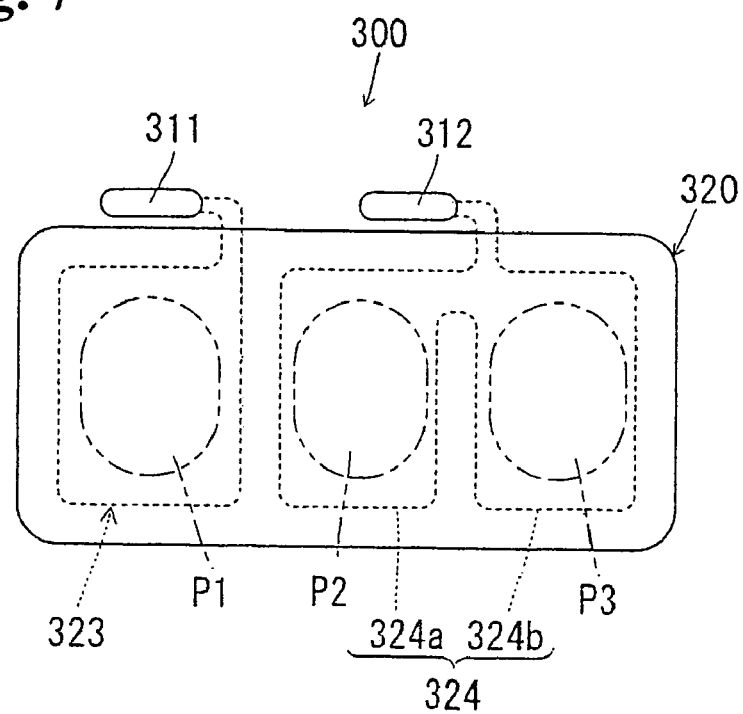
FIG. 7 is a schematic view showing a structure of an airbag apparatus according to a further embodiment of the present invention.
Figure 8:
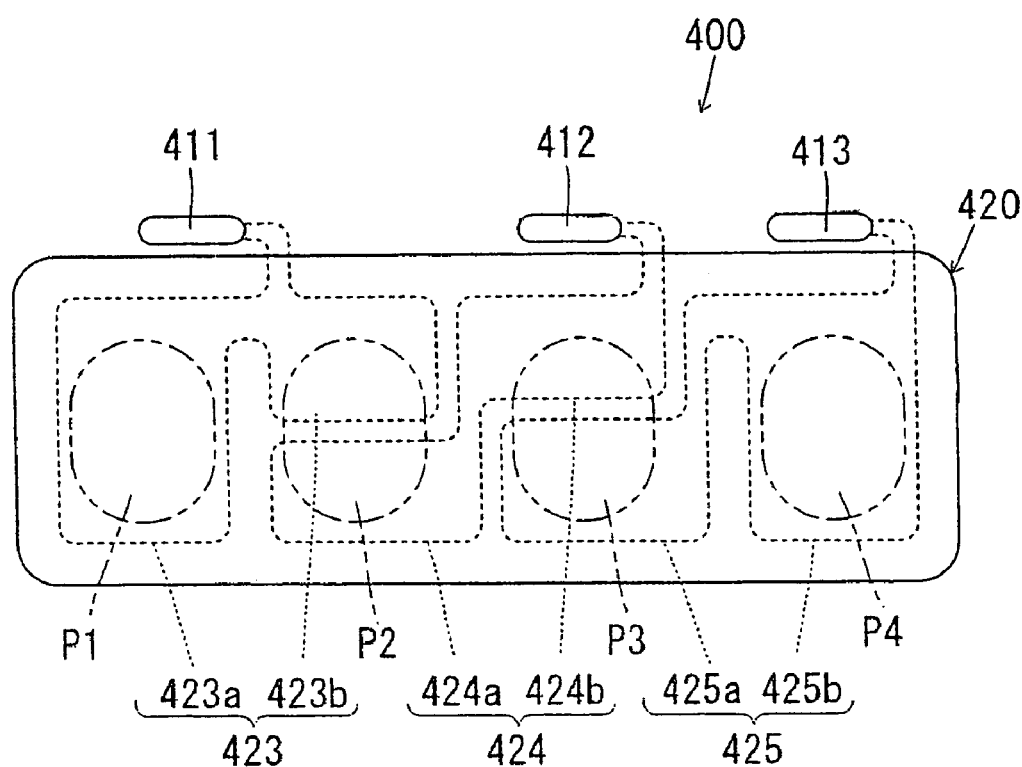
FIG. 8 is a schematic view showing a structure of an airbag apparatus according to a still further embodiment of the present invention.

According to the present invention, the inside of the vehicle airbag may be divided in various ways other than that of the airbag 120. As other embodiments of the airbag apparatus 100, airbag apparatuses 200, 300, and 400 will be described in terms of an inner structure of the vehicle airbag with referring to FIGS. 6 to 8. In FIGS. 6 to 8, components same as those in FIG. 3 are indicated by the same reference numerals, and detailed descriptions of the components are omitted.

The airbag apparatus 200 shown in FIG. 6 (corresponding to the airbag apparatus of the present invention) is installed in a vehicle capable of providing a three-seat-row arrangement. The airbag apparatus 200 mainly includes an airbag 220 (corresponding to the airbag of the present invention) having three inflatable parts 223, 224, and 225 (corresponding to the sections of the present invention) independent from each other; a first inflator 211 (corresponding to the gas supplying device of the present invention) capable of individually supplying inflation gas to the inflatable part 223; a second inflator 212 (corresponding to the gas supplying device of the present invention) capable of independently supplying inflation gas to the inflatable part 224; and a third inflator 213 (corresponding to the gas supplying device of the present invention) capable of independently supplying inflation gas to the inflatable part 225. In this embodiment, the inflatable part 223 is inflated in the passenger-protection region P1, the inflatable part 224 is inflated in the passenger-protection region P2, and the inflatable part 225 is inflated in the passenger-protection region P3.

The structure of the airbag apparatus 200 wherein one inflatable part corresponds to one passenger-protection region may be applied to a vehicle capable of having more than four-seat-rows.

The airbag apparatus 300 shown in FIG. 7 (corresponding to the airbag apparatus of the present invention) is installed in a vehicle capable of having a three-seat-row arrangement. The airbag apparatus 300 mainly includes an airbag 320 (corresponding to the airbag of the present invention) having two inflatable parts 323 and 324 (corresponding to the sections of the present invention) independent from each other; a first inflator 311 (corresponding to the gas supplying device of the present invention) capable of independently supplying inflation gas to the inflatable part 323; and a second inflator 312 (corresponding to the gas supplying device of the present invention) capable of independently supplying inflation gas to the inflatable part 324. The inflatable part 324 includes a first chamber 324a and a second chamber 324b. In this embodiment, the inflatable part 323 is inflated in the passenger-protection region P1, the first chamber 324a of the inflatable part 324 is inflated in the passenger-protection region P2, and the second chamber 324b of the inflatable part 324 is inflated in the passenger-protection region P3.

The structure may be modified as required so that the inflatable part 323 is inflated in the passenger-protection regions P1 and P2 and the inflatable part 324 is inflated in the passenger-protection region P3.

The airbag apparatus 400 shown in FIG. 8 (corresponding to the airbag apparatus of the present invention) is installed in a vehicle capable of having a four-seat-row arrangement. The airbag apparatus 400 mainly includes an airbag 420 (corresponding to the airbag of the present invention) having three inflatable parts 423, 424, and 425 (corresponding to the sections of the present invention) independent from each other) a first inflator 411 (corresponding to the gas supplying device of the present invention) capable of individually supplying inflation gas to the inflatable part 423; a second inflator 412 (corresponding to the gas supplying device of the present invention) capable of independently supplying inflation gas to the inflatable part 424; and a third inflator 413 (corresponding to the gas supplying device of the present invention) capable of independently supplying inflation gas to the inflatable part 425. The inflatable part 423 includes a first chamber 423a and a second chamber 423b. The inflatable part 424 includes a first chamber 424a and a second chamber 424b. The inflatable part 425 includes a first chamber 425a and a second chamber 425b.

In this embodiment, the first chamber 423a of the inflatable part 423 is inflated in the passenger-protection region P1. The second chamber 423b of the inflatable part 423 and the first chamber 424a of the inflatable part 424 are inflated in the passenger-protection region P2, so that both chambers vertically overlap each other. The second chamber 424b of the inflatable part 424 and the first chamber 425a of the inflatable part 425 are inflated in the passenger-protection region P3, so that both chambers vertically overlap each other. The second chamber 425b of the inflatable part 425 is inflated in the passenger-protection region P4.

Similar to the airbag apparatus 100, the airbag apparatuses 200, 300, and 400 can quickly provide gas to each inflatable part even when the airbag has a large size. Moreover, gas is reliably supplied to each inflatable part. In particular, the airbag apparatuses 300 and 400 have simple structures in which one inflatable part is inflated across the two passenger-protection regions P2 and P3.

In the embodiments, one airbag 120 including two inflatable parts (front inflatable part 123 and rear inflatable part 124) is provided for protecting the passengers C seated in the first S1 to third seat-rows S3. The airbag apparatus may include a plurality of airbags having a plurality of sections such as inflatable parts, wherein the sections protect the passengers C seated in the first seat-row S1 to the third seat-row S3.

In the embodiments, the first inflator 111 and the second inflator 112 are disposed apart from each other. The present invention may include two inflators disposed integrally depending on a positional relationship of each inflatable part and each inlet. When the two inflators are disposed integrally, two independent gas-generating mechanisms may be disposed inside a single housing.

In the embodiments, the front inflatable part 123 and the rear inflatable part 124 partially overlap each other in the vertical direction when the airbag 120 is inflated. In the present invention, a plurality of inflatable parts may overlap in any direction. Moreover, in the present invention, the front inflatable part 123 and the rear inflatable part 124 may entirely overlap each other.

In the embodiments, the airbag apparatus is installed in an automobile capable of having a three-seat-row arrangement. The present invention may be applied to an airbag apparatus installed in various vehicles, such as a train or a marine vessel, in addition to small and large automobiles capable of having more than three rows of seats (i.e., a four-seat-row arrangement, a five-seat-row arrangement, or more).

The disclosure of Japanese Patent Application No. 2003-430650, filed on Dec. 25, 2003, is incorporated in the application.

While the invention has been explained with reference to the specific embodiments of the invention, the explanation is illustrative and the invention is limited only by the appended claims.

What is claimed is:

1. An airbag apparatus for a vehicle having a sidewall and at least three seatrows arranged in a longitudinal direction of the vehicle, comprising:
a vehicle airbag installed at an upper portion of the sidewall of the vehicle to be inflated downwardly in passenger-protection regions between passengers seated in seats and the sidewall of the vehicle for protecting the passengers upon a vehicle accident, said vehicle airbag extending at the upper portion of the sidewall between a first region corresponding to a first seat-row from a front side of the vehicle to a third region corresponding to a third seatrow from the front side of the vehicle,
first and second sections disposed in the vehicle airbag for completely separately defining an inside of the vehicle airbag, each of said first and second sections having a main inflatable chamber forming one passenger-protection region and a sub-inflatable chamber located at a side of the main inflatable chamber, said sub-inflatable chamber of the first section being configured to overlap with the subinflatable chamber of the second section in a vertical direction to form one passenger-protection region by the two sub-inflatable chambers when the vehicle airbag is inflated,
a first gas supplying device for supplying gas to the first section, and
a second gas supplying device for supplying gas to the second section.

2. An airbag apparatus according to claim 1, wherein said second region includes at an upper section the sub-chamber communicating with the main inflatable chamber of the first section, and at a lower section the sub-chamber communicating with the main inflatable chamber of the second section.

3. An airbag apparatus for a vehicle having a sidewall and at least three seat-rows arranged in a longitudinal direction of the vehicle, comprising:
a vehicle airbag installed at an upper portion of the sidewall of the vehicle to be inflated downwardly in passenger-protection regions between passengers seated in seats and the sidewall of the vehicle for protecting the passengers upon a vehicle accident, said vehicle airbag extending at the upper portion of the sidewall between a first region corresponding to a first seat-row from a front side of the vehicle to a third region corresponding to a third seatrow from the front side of the vehicle,
first, second and third sections disposed in the vehicle airbag for completely separately defining, an inside of the vehicle airbag, each of said first and second sections having a main inflatable chamber forming one passenger-protection region and a sub-inflatable chamber located at a side of the main inflatable chamber, said third section having two sub-inflatable chambers spaced apart vertically and laterally, said subinflatable chamber of the first section being configured to overlap with the sub-inflatable chamber of the third section in a vertical direction and said sub-inflatable chamber of the second section being configured to overlap with the sub-inflatable chamber of the third section in the vertical direction to form one passenger-protection region, respectively, by the two sub-inflatable chambers when the vehicle airbag is inflated,
a first gas supplying device for supplying gas to the first section,
a second gas supplying device for supplying gas to the second section, and
a third gas supplying device for supplying gas to the third section.

* * * * *